Feb. 16, 1932.    P. H. FLAUTT    1,845,965
BOTTLE CLOSURE AND POURING SPOUT
Filed March 11, 1929    2 Sheets-Sheet 1
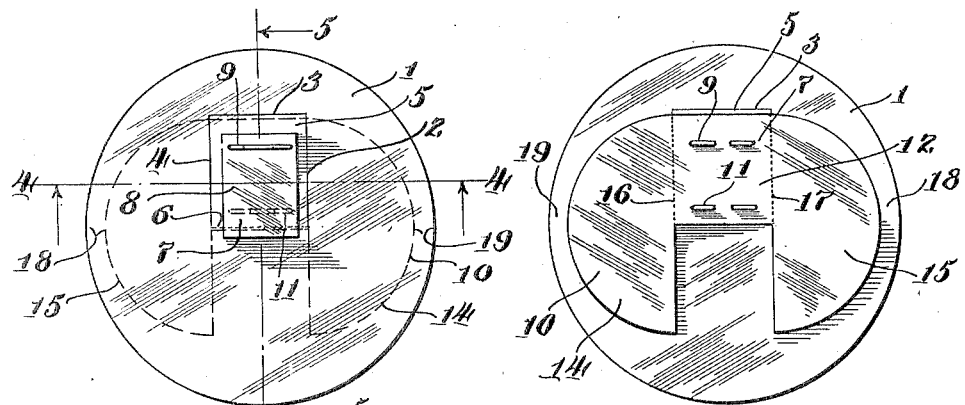
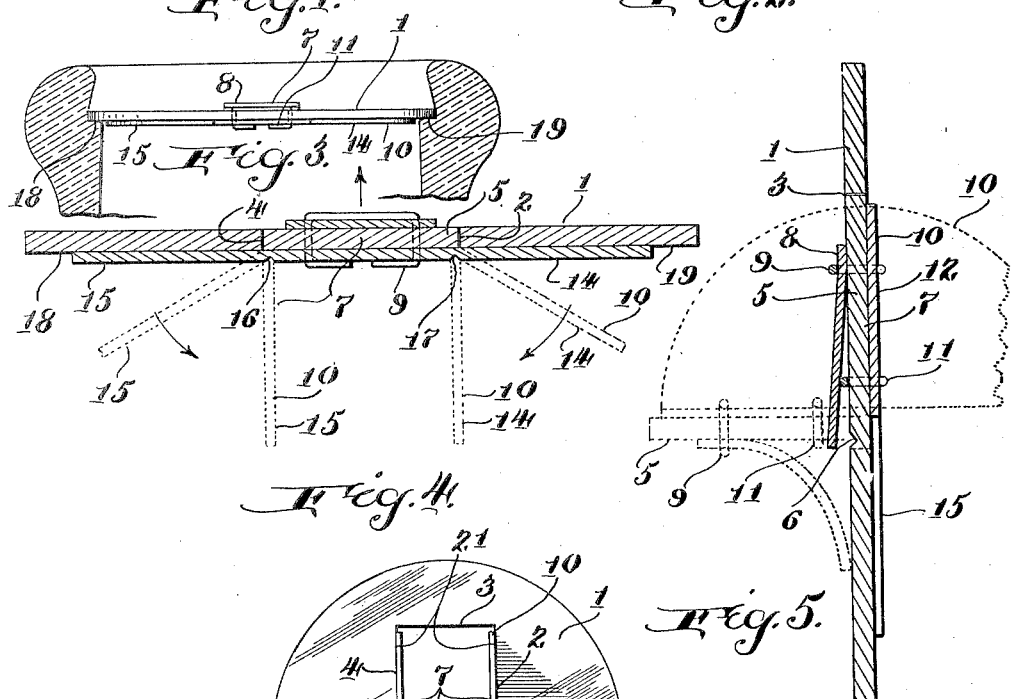
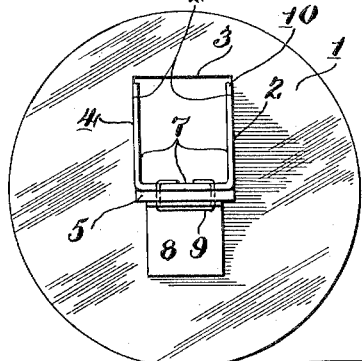
INVENTOR.

Feb. 16, 1932. P. H. FLAUTT 1,845,965
BOTTLE CLOSURE AND POURING SPOUT
Filed March 11, 1929 2 Sheets-Sheet 2
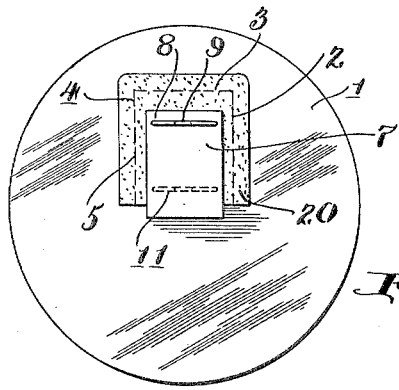
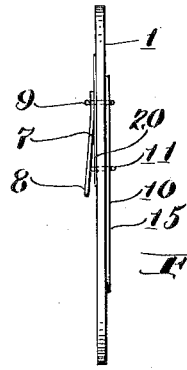
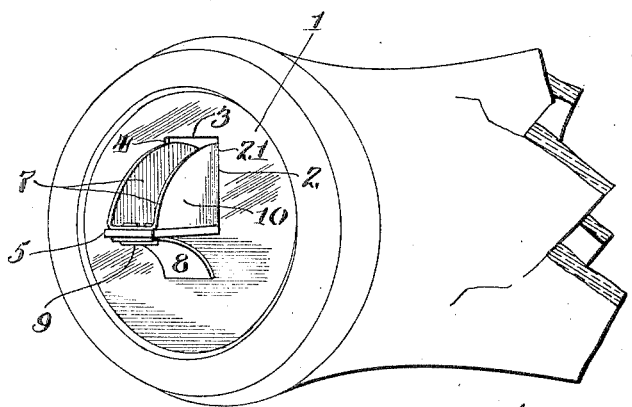
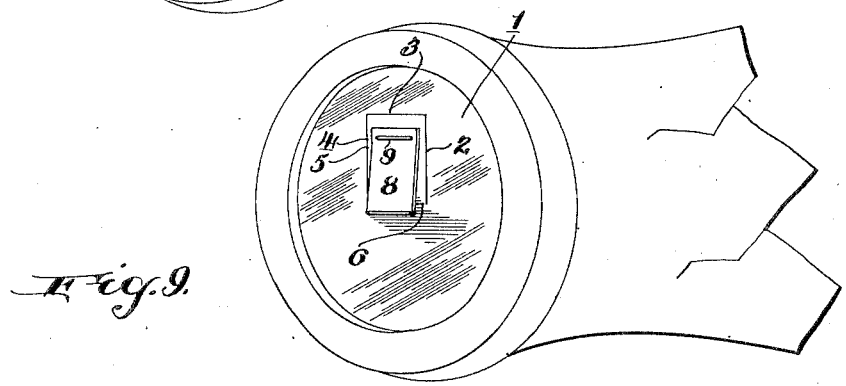
INVENTOR.

Patented Feb. 16, 1932

1,845,965

UNITED STATES PATENT OFFICE

PORTER H. FLAUTT, OF BALTIMORE, MARYLAND, ASSIGNOR OF ONE-HALF TO FRANCIS C. YINGLING, OF BALTIMORE, MARYLAND

BOTTLE CLOSURE AND POURING SPOUT

Application filed March 11, 1929. Serial No. 346,191.

The present invention relates to an improved form of bottle closure and pouring spout.

It is the purpose and object of the present invention to provide a bottle cap and pouring spout that is particularly adaptable to milk bottles and the like; having a single thickness of material at its outer periphery for engaging the lip of a milk bottle.

A further object of the present invention is to provide a milk bottle cap with a pouring spout thereon, the whole being of substantially thin cross section.

A further object of the present invention is to provide a bottle cap, particularly adaptable to milk bottles having means thereon to form a pouring spout in the form of a flat single layer of material.

A further object of the present invention is to provide a combination bottle cap and pouring spout, having opening and closing means, all being formed and comprised of single flat layers of material.

Another object of the present invention is to provide a bottle cap having a single layer of material attached thereto, capable of forming itself into a pouring spout upon being pulled.

A further object of the present invention is to provide a bottle cap and pouring spout in combination forming a substantially flat member in cross section for purposes of ready attaching and applying in and to the standard bottle capping machines for milk bottles.

A further object and purpose of the present invention is to provide in the combination of bottle cap and pouring a sealed spout opening.

In the accompanying drawings I have illustrated a combination of milk bottle cap and pouring spout embodying the various features of my invention in their preferred form.

In the drawings:

Figure 1 is a plan view of the bottle cap and pouring spout in closed position.

Figure 2 is an inverted plan view of the same; illustrating the construction particularly of the flat winged shaped member which forms into a pouring spout when pulled.

Figure 3 is a front elevational view partly in section illustrating the invention applied to a milk bottle.

Figure 4 is a cross sectional view of the invention on the line 4—4 of Figure 1.

Figure 5 is a cross sectional view of the invention on the line 5—5 of Figure 1.

Figure 6 is a view similar to Figure 1 of the invention, illustrating the pouring spout in open position.

Figure 7 is a plan view of a slightly modified form of the present invention illustrating the use of a seal over the pouring spout portion of the bottle cap.

Figure 8 is a side elevation of the invention as disclosed in Figure 7.

Figure 9 is a perspective view of the invention shown as applied to the opening of a milk bottle, the pouring spout being shown in closed position.

Figure 10 is a similar view to Figure 9, except that the pouring spout is shown in operation, or open position.

Referring to the drawings by numerals, the invention as disclosed, consists of a flat disc-shaped member 1, particular reference being made to Figures 1 to 6, that is cut clear through on the lines 2, 3 and 4, forming an inverted U shaped tongue portion 5, which may be scored at 6, for purposes of determining the line on which the pouring spout 7 as a whole will fulcrum. The thumb tab 8 for purposes of readily opening and closing the pouring spout may be fastened to the inverted U shaped cap portion 5 by means of the staple 9, which staple is also used to fasten the wing shaped member 10 to the U shaped cap portion 5. For purposes of better securing these members together another staple 11 may be used as shown. It is understood that any type of practical fastening means may be used in place of the staple.

The wing shaped member 10 consists of a center portion 12 and side wings 14 and 15. For purposes of definitely determining the lines on which these wings will bend, in their function of forming the side walls of the pouring spout, they may be scored as shown at 16 and 17, see Figures 2 and 4.

As may readily be seen from Figure 3 these wing members stop short at 18 and 19 of the periphery of the cap, particularly for the purpose of allowing the even and uniform thickness of the standard milk bottle cap sealing edge to be used in the present invention, thus allowing for a substantially perfect sealing function between the cap portion of the invention and the bottle sealing lip.

A slightly modified form of the present invention is shown in Figures 7 and 8, by the addition of a sealing member 20, made up of a thin piece of paraffin treated paper, for the purpose of sealing the cut portions of the cap at 2, 3 and 4. This sealing member 20 may be held in place by the staple 9 as shown and its edges sealed by means of paraffin or any type of sanitary paste.

The structure of the cap and pouring spout details are the same as those of the previously described cap and pouring spout. It is readily understood, when the thumb member 8 is pulled this seal 20 is broken and does not interfere with the function of the pouring spout 7.

The operation of the invention is as follows: when the milk is delivered to the housewife with the present invention used as a sealing means, it is not necessary for her to go to the messy, unsanitary and inconvenient operation of removing the cap from the bottle, but to merely pull on the thumb member 8, thus the inverted U shaped portion 5 of the cap will be swung outwardly on the scored line 6, the center portion 12 of the wing member 10 will also swing forward and downwardly to the desired degree or angle for convenient pouring of the contents of the bottle. This operation causes the wings 14 and 15 to swing inwardly on their respective scored lines 16 and 17, as shown by dotted lines in Figure 4, due to their action in passing through the opening formed by the displacement of the inverted U shaped member 5. Thus the center portion 12 and the wing portions 14 and 15 form the desired shape for a practical pouring spout, i. e. rigid bottom and side walls respectively for the discharge and passage of the bottle contents.

If only a portion of the contents of the bottle is used the pouring spout may be pushed back to its previous and original closed position. Thus a practical pouring spout is provided the housewife for the milk bottle to prevent the milk from running down the side of the bottle when being poured. The inconvenience of removing the cap is done away with as well as the unsanitary replacement of a possibly dirty cap.

The present invention also provides and presents an absolutely new, sanitary and untouched surface for the milk to pour over, instead of the unsanitary lip of the bottle which is so frequently handled and touched by the hands.

I have thus described my invention specifically and in detail in order that its nature and operation may be fully understood; however, the specific terms herein are used descriptively rather than in their limiting sense, and the scope of the invention is defined in the claims.

What I claim and desire to secure by Letters Patent:

1. A milk bottle stopple having opening forming means thereon means for forming a pouring spout when said means are drawn through said stopple opening means, composed of a substantially flat layer of material.

2. A disc-shaped milk bottle stopple having means for forming an opening therein and a substantially flat member composed of a single layer of material fixed to said opening means, and means for forming said substantially flat member into a pouring spout when the same is partly drawn through the opening formed by said opening means.

3. A disc shaped milk bottle stopple having means for forming an opening therein, finger engaging means for opening and closing said opening forming means, and a substantially flat member fixed to said opening means, and means for forming said substantially flat member into a pouring spout when the same is partly drawn through the opening formed by said opening means.

4. A disc shaped milk bottle stopple having means for forming an opening therein, and a substantially flat wing shaped member fixed to said opening means, said wing shaped member being set back and away from the peripheral sealing edge of the disc shaped stopple forming a non-interrupted peripheral sealing edge of a single piece of material, and means for forming said wing shaped member into a pouring spout when the same is drawn through the opening formed by said opening means.

5. A disc shaped milk bottle stopple having means for forming an opening therein and pouring spout forming means fixed to said opening means, and means for forming said pouring spout forming means into a pouring spout when the same is partly drawn through the opening formed by said opening means.

6. A disc shaped milk bottle stopple having means for forming an opening therein, and a substantially flat member, composed of a single piece of material fixed to said opening means, and means for forming said substantially flat member into a pouring spout when the same is partly drawn through the opening formed by said opening means.

7. A disc shaped milk bottle stopple having means for forming an opening therein, said opening forming means having finger gripping means thereon, said disc shaped stopple being superimposed upon and fixed to a substantially flat member, means for forming said substantially flat member into a pouring spout when the same passes through the opening formed by said opening means.

8. A milk bottle sealing stopple having means for forming an opening therein, and having a continuous peripheral sealing edge of uniform thickness, said stopple being superimposed upon and having fixed thereto means for forming a pouring spout when said stopple opening means is partly drawn out and away from the upper surface of said stopple.

9. A disc shaped milk bottle stopple having means for forming an opening therein, means superimposed upon said opening forming means for the purpose of creating a temporary seal to said opening means, a substantially flat member composed of a single layer of material without folds fixed to said opening means, and means for forming said substantially flat member into a pouring spout when the same is partly drawn through the opening formed by said opening means.

Signed by me at Baltimore, Maryland, this 9th day of March, 1929.

PORTER H. FLAUTT.